United States Patent [19]
Gault et al.
[11] 4,075,118
[45] Feb. 21, 1978

[54] LIQUID DETERGENT COMPOSITIONS CONTAINING A SELF-EMULSIFIED SILICONE SUDS CONTROLLING AGENT

[75] Inventors: Terrell Wilson Gault, Seattle, Wash.; Edward John Maguire, Jr., Cincinnati, Ohio

[73] Assignee: The Procter & Gamble Company, Cincinnati, Ohio

[21] Appl. No.: 731,256

[22] Filed: Oct. 12, 1976

Related U.S. Application Data

[63] Continuation-in-part of Ser. No. 622,305, Oct. 14, 1975, abandoned.

[51] Int. Cl.[2] ........................ C11D 3/37; B01D 19/04; C11D 3/20

[52] U.S. Cl. ................................ 252/135; 252/89 R; 252/DIG. 14

[58] Field of Search ..................... 252/89 R, 135, 321, 252/358, DIG. 14, DIG. 1

[56] References Cited

U.S. PATENT DOCUMENTS

| | | | |
|---|---|---|---|
| 3,233,986 | 2/1966 | Morehouse | 44/76 |
| 3,235,509 | 2/1966 | Nitzsche et al. | 252/358 |
| 3,250,727 | 5/1966 | Noll et al. | 252/358 |
| 3,383,327 | 5/1968 | Sullivan | 252/358 |
| 3,455,839 | 7/1969 | Rauner | 252/321 |
| 3,511,788 | 5/1970 | Keil | 260/2.5 |
| 3,563,901 | 2/1971 | Crotti | 252/89 X |
| 3,700,400 | 10/1972 | Cuthbertson | 8/83 |
| 3,746,653 | 5/1973 | Churchfield | 252/321 |
| 3,784,479 | 1/1974 | Keil | 252/358 |
| 3,829,386 | 8/1974 | Wegst | 252/135 |
| 3,912,652 | 10/1975 | Colquhoun | 252/358 |
| 3,933,672 | 1/1976 | Bartolotta et al. | 252/358 |
| 4,005,044 | 1/1977 | Raleigh | 252/358 |

FOREIGN PATENT DOCUMENTS

| | | |
|---|---|---|
| 1,373,903 | 11/1974 | United Kingdom. |

*Primary Examiner*—Harris A. Pitlick
*Attorney, Agent, or Firm*—Robert B. Aylor; Thomas H. O'Flaherty; Richard C. Witte

[57] ABSTRACT

Concentrated, essentially homogeneous, low-sudsing liquid detergent compositions containing a mixture of nonionic surfactants, anionic surfactants, and a self-emulsified silicone suds controlling agent.

20 Claims, No Drawings

LIQUID DETERGENT COMPOSITIONS CONTAINING A SELF-EMULSIFIED SILICONE SUDS CONTROLLING AGENT

CROSS REFERENCE TO RELATED APPLICATIONS

This application is a continuation-in-part of our copending application for LIQUID DETERGENT COMPOSITIONS, Ser. No. 622,305, filed Oct. 14, 1974, now abandoned.

BACKGROUND OF THE INVENTION

The present invention relates to concentrated low-sudsing liquid detergent compositions. Such compositions contain, as the active detersive ingredients, a nonionic surfactant component and an anionic surfactant component. The compositions may also contain an alkanolamine, a minor proportion of a fatty acid corrosion inhibitor and/or an alkali metal base.

Concentrated liquid detergent compositions are well known in the art. Usually such compositions (see, for example, U.S. Pat. Nos. 2,908,651; 2,920,045; 3,272,753; 3,393,154; and Belgian Pat. Nos. 613,165 and 665,532) contain a synthetic organic detergent component which is generally anionic, nonionic or mixed anionic-nonionic in nature; an inorganic builder salt; and a solvent, usually water and/or alcohol. These compositions frequently contain a hydrotrope or solubilizing agent to permit the addition of sufficient quantities of surfactant and builder salt to provide a reasonable volume usage/performance ratio. Other compositions, like the preferred compositions of this invention, have not contained builders. For example, U.S. Pat. No. 3,528,925 discloses substantially anhydrous liquid detergent compositions which consist of an alkyl aryl sulfonic acid, a nonionic surface active agent and an alkanolamine component. U.S. Pat. No. 2,875,153 discloses liquid detergent compositions containing a nonionic surfactant component and a sodium soap component. U.S. Pat. No. 2,543,744 discloses a low-foaming dishwashing composition comprising a nonionic, water-soluble, synthetic detergent and a water-soluble soap in the form of an alkali metal, ammonium or amine salt. The copending application of Jones et al U.S. Ser. No. 591,987 filed June 30, 1975 and now abandoned for Liquid Detergent Composition discloses similar compositions in which the more usual sodium alkylbenzene sulfonate is replaced by a magnesium or calcium anionic surfactant.

U.S. Pat. No. 3,663,445 relates to liquid cleaning and defatting compositions containing a nonionic surfactant, an alkanolamine-neutralized anionic surfactant, alkanolamine and fatty acid.

U.S. Pat. No. 3,864,399 and the copending application of Collins, Ser. No. 521,414, filed Nov. 6, 1974, entitled Liquid Detergent Compositions, relate to detergent mixtures comprising a high ratio of nonionic to anionic surfactant and free alkanolamine.

U.S. Pat. Nos. 3,709,838; 3,697,451; 3,554,916; 3,239,468; 2,947,702; 2,551,634; British Pat. Nos. 900,000; 842,813; 759,877; Canadian Pat. No. 615,583; and Defensive Publications T903,009 and T903,010 disclose a variety of detergent compositions containing mixed nonionic-anionic surfactants, both with and without alkanolamines. All of the above references are incorporated by reference and can be suppressed by the silicone suds-suppressing agents disclosed hereinafter.

As can be seen from the foregoing, a substantial effort has been expended in developing low-built and builder-free detergent compositions in liquid form. Yet, there are several problems associated with the art-disclosed compositions which render them less than optimal for widescale use.

Especially, many of the prior art compositions give too many suds when used, e.g., in front-loading automatic washers.

The copending application of Collins, et al., entitled Liquid Detergent Compositions, Ser. No. 376,641, filed July 5, 1973, the disclosures of which are incorporated herein by reference, teaches that certain ethylene oxide-based nonionic surfactants can be used at high concentrations in liquid detergent compositions, in combination with alkanolamines and certain anionic surfactants, and without the need for fatty acid-based stabilizers. The compositions disclosed by Collins, et al., provide builder-free, liquid detergent compositions which exhibit both excellent pre-wash and through-the-wash fabric cleansing.

It is an object of this invention to provide concentrated liquid detergent compositions which exhibit excellent pre-wash and through-the-wash fabric cleaning, and which do not produce excessive suds during use.

This and other objects are obtained herein, as will be seen from the following disclosure.

SUMMARY OF THE INVENTION

The present invention encompasses a concentrated, essentially homogeneous, low-sudsing liquid detergent composition comprising: (a) from about 10% to about 50% by weight of a nonionic surfactant; (b) from about 10% to about 50% by weight of an anionic surfactant, the total amount of surfactant being more than about 30% by weight and the ratio of nonionic surfactant to anionic surfactant being within the range of from about 1:8 to about 8:1 based on the free acid form of the anionic surfactant; and (c) an effective amount, preferably from about 0.01% to about 5% by weight, of a self-emulsifiable silicone suds controlling agent.

DETAILED DESCRIPTION OF THE INVENTION

The individual components of the instant detergent compositions are described in detail below.

The Nonionic Surfactant

The instant compositions contain as an essential ingredient from about 10% to about 50%, preferably from about 15% to about 40%, most preferably from about 20% to about 30%, by weight of a nonionic surfactant.

The nonionic surfactants can be prepared by a variety of methods well known in the art. In general terms, such nonionic surfactants are typically prepared by condensing ethylene oxide with an —OH containing hydrocarbyl moiety, e.g., an alcohol or alkyl phenol, under conditions of acidic or basic catalysis.

Nonionic surfactants for use herein comprise the typical nonionic surface active agents well known in the detergency arts. Such materials can be succinctly described as the condensation products of an alkylene oxide (hydrophilic in nature), especially ethylene oxide (EO), with an organic hydrophobic compound, which is usually aliphatic or alkyl aromatic in nature. The length of the hydrophilic (i.e., polyoxyalkylene) moiety which is condensed with any particular hydrophobic compound can be readily adjusted to yield a water-soluble compound having the desired degree of balance between hydrophilic and lipophilic elements, i.e., the "HLB".

The HLB of the ethoxylated nonionics used herein can be experimentally determined in well-known fashion, or can be calculated in the manner set forth in Decker, EMULSIONS THEORY AND PRACTICE, Reinhold 1965, pp. 233 and 248. For example, the HLB of the nonionic surfactants herein can be simply approximated by the term: HLB = E/5; wherein E is the weight percentage of ethylene oxide content in the molecule. Of course, the HLB will vary, for a given hydrocarbyl content, with the amount of ethylene oxide.

Preferred nonionic surfactants for use in the present compositions and processes are characterized by an HLB in the range of from 9 to 20, most preferably 10 to 14.

Specific, non-limiting examples of suitable water-soluble nonionic surfactants include the following.

The ethylene oxide condensates of alkyl phenols are a well-known type of water-soluble ethoxylated nonionic surfactant. These compounds include the condensation products of alkyl phenols having an alkyl group containing from about 6 to 18 carbon atoms in either a straight chain or branched chain configuration, with EO, said EO being present in amounts from about 3 to about 25 moles of EO per mole of alkyl phenol. The alkyl substituent in such compounds can be derived, for example, from polymerized propylene, diisobutylene, octene, or nonene. Examples of compounds of this type include nonyl phenol condensed with about 9.5 moles of EO per mole of nonyl phenol; dodecyl phenol condensed with about 12 moles of EO per mole of phenol; dinonyl phenol condensed with about 15 moles of EO per mole of phenol; and di-isooctylphenol condensed with about 15 moles of EO per mole of phenol. Commercially available nonionic surfactants of this type include Igepal CO-630, marketed by the GAF Corporation, and Triton X-45, X-114, X-100 and X-102, all marketed by the Rohm and Haas Company.

The condensation products of aliphatic alcohols with 2 to 20 moles of ethylene oxide are another (and highly preferred) type of nonionic surfactant used herein. The alkyl chain of the aliphatic alcohol can be either straight or branched, and generally contains from about 8 to about 22, preferably 9 to 16, carbon atoms. The alcohols can be primary, secondary, or tertiary. Examples of such ethoxylated alcohols include the condensation product of about 6 moles of EO with 1 mole of tridecanol; myristyl alcohol condensed with about 10 moles of EO per mole of myristyl alcohol; the condensation product of EO with coconut fatty alcohol wherein the coconut alcohol is primarily a mixture of fatty alcohols with alkyl chains varying from 10 to about 14 carbon atoms in length and wherein the condensate contains about 6 moles of EO per mole of total alcohol; and the condensation product of about 9 moles of EO with the above-described coconut alcohol. Tallow alcohol ethoxylates $(EO)_6$ to $(EO)_{11}$ are similarly useful herein. Examples of commercially available nonionic surfactants of the foregoing type include Tergitol 15-S-9, marketed by the Union Carbide Corporation; Neodol 23-6.5, marketed by the Shell Chemical Company; and Kyro EOB, marketed by The Procter & Gamble Company.

The condensation products of ethylene oxide with a hydrophobic base formed by the condensation of propylene oxide with propylene glycol constitute another type of nonionic surfactant. The hydrophobic portion of these compounds has a molecular weight of from about 1500 to 18,000 and, of course, exhibits water insolubility. The addition of poly-EO moieties to this hydrophobic portion tends to increase the water-solubility of the molecule as a whole, and the liquid character of the product is retained up to the point where the EO content is about 50% of the total weight of the condensation product. Examples of compounds of this type include certain of the commercially available Pluronic surfactants, marketed by BASF Wyandotte.

The condensation products of ethylene oxide with the product resulting from the reaction of propylene oxide and ethylenediamine are another type of nonionic surfactant useful herein. The hydrophobic "base" of these condensation products consists of the reaction product of ethylenediamine and excess propylene oxide, said base having a molecular weight of from about 2500 to about 3000. This base compound is thereafter condensed with EO to the extent that the condensation product contains from about 40% to about 80% by weight of poly-EO and has a molecular weight of from about 5,000 to about 11,000. Examples of this type of nonionic surfactant include certain of the commercially available Tetronic compounds, marketed by BASF Wyandotte.

The highly preferred nonionic surfactants herein include the $EO_1$–$EO_{20}$ condensates of $C_9$ to $C_{18}$ primary and secondary alcohols; the condensates of primary alcohols are most preferred. Non-limiting, specific examples of nonionic surfactants of this type are as follows (the abbreviations used for the nonionic surfactants, e.g., $C_{14}(EO)_6$, are standard for such materials and describe the carbon content of the lipophilic portion of the molecule and the ethylene oxide content of the hydrophilic portion): n-$C_{14}H_{29}(EO)_5$; n-$C_{14}H_{29}(EO)_6$; n-$C_{14}H_{29}(EO)_7$; n-$C_{14}H_{29}(EO)_{10}$; n-$C_{15}H_{31}(EO)_6$; n-$C_{15}H_{31}(EO)_7$; 2-$C_{15}H_{31}(EO)_7$; n-$C_{15}H_{31}(EO)_8$; 2-$C_{15}H_{31}(EO)_8$; n-$C_{15}H_{31}(EO)_9$; 2-$C_{15}H_{31}(EO)_9$; n-$C_{16}H_{33}(EO)_9$; and 2-$C_{16}H_{33}(EO)_9$.

It is to be recognized that mixtures of the foregoing nonionic surfactants are also useful herein and are readily available from commercial alcohol mixtures.

It will be appreciated that the degree of ethoxylation in the nonionics listed herein can vary somewhat, inasmuch as average fractional degrees of ethoxylation occur. For example, n-$C_{15}H_{31}(EO)_7$ can contain small quantities of n-$C_{15}H_{31}(EO)_0$ and n-$C_{15}H_{31}(EO)_{14}$. Commercial mixtures will contain portions of materials of varying EO contents, and the stated EO content represents an average. Such mixtures are quite suitable for use in the present compositions and processes.

Highly preferred alcohol-based nonionic surfactants are the $C_{14-15}(EO)_{6-9}$ materials disclosed hereinabove, which are commercially available as mixtures under the names Neodol 45-7 and Neodol 45-9 from the Shell Chemical Co. Neodol 45-7 is a liquid at ambient temperatures (and is more preferred herein for this reason) whereas Neodol 45-9 is a solid at room temperature. However, solid nonionics such as Neodol 45-9 are also useful in the instant liquid compositions inasmuch as they readily dissolve therein. Other highly preferred nonionics include Dobanol 91-8 ("OXO"-based alcohol from Shell) and Softanol, available from Nippon Shokubei.

When using commercial nonionic mixtures, especially of lower ($C_9$–$C_{10}$) alkyl chain length, it is preferred that the un-ethoxylated alcohols and lower $(EO)_1$–$(EO)_2$ ethoxylates be removed, or "stripped", to reduce undesirable odors. Stripping can be done in vacuo or by standard distillation means.

The preferred nonionic materials herein are alcohols having a carbon content of from $C_8$ to about $C_{18}$ condensed with from about 2 (avg.) moles to about 12 (avg.) moles of ethylene oxide per mole of alcohol, and further characterized by an HLB within the range of from about 8 to about 15, preferably from about 9 to about 14. Nonionic surfactants falling within these ranges are highly preferred herein from the standpoint of optimal pre-treatment cleansing, optimal through-the-wash cleansing and product stability.

The nonionic surfactants employed in the present compositions can be prepared by a variety of methods well known in the art. In general terms, such nonionic surfactants are prepared by condensing ethylene oxide with an alcohol under conditions of acidic or basic catalysis.

The nonionic surfactants herein include the ethylene oxide condensates of both primary and secondary alcohols; the condensates of primary alcohols are preferred. Non-limiting, specific examples of nonionic surfactants having the requisite carbon content of the hydrocarbyl portion of the molecule, the requisite ethylene oxide content and the requisite HLB are as follows: n-$C_8H_{17}(EO)_5$; n-$C_9H_{19}(EO)_4$; n-$C_{10}H_{21}(EO)_8$; n-$C_{11}H_{23}(EO)_8$; n-$C_{12}$-$H_{25}(EO)_9$; n-$C_{14}H_{29}(EO)_7$; n-$C_{15}H_{31}(EO)_7$; n-$C_{16}H_{33}(EO)_{11}$; n-$C_{18}H_{37}(EO)_{11}$; and n-$C_{14-15}H_{29-30}(EO)_4$.

Other preferred surfactants are those of Collins, patent application U.S. Ser. No. 557,217, filed Mar. 10, 1975, incorporated herein by reference.

It is to be recognized that mixtures of the foregoing nonionic surfactants are also useful herein and are readily available from commercial alcohol mixtures. Moreover, the degree of ethoxylation can vary somewhat, inasmuch as average fractional degrees of ethoxylation occur. For example, n-$C_{10}H_{21}(EO)_8$ can contain small quantities of n-$C_{10}H_{21}(EO)_0$ and n-$C_{10}H_{21}(EO)_{14}$. Such commercial mixtures falling within the limits disclosed herein are useful in the present detergent compositions.

The preferred nonionic surfactants are the $C_{14-15}(EO)_{4-7}$, materials disclosed hereinabove and are commercially available as a mixture under the names Dobanol 45-4 and Dobanol 45-7 from the Shell Chemical Co. These materials are liquids at ambient temperatures and are preferred herein.

Anionic Surfactant

The anionic component of the instant detergent compositions can be an organic sulfuric reaction product having in its molecular structure an alkyl, aryl, alkaryl or aralkyl group containing from about 6 to about 22 carbon atoms and a sulfonic acid or sulfuric acid ester group, or mixtures thereof. (Included in the term "alkyl" is the alkyl portion of acyl groups). Examples of this group of synthetic detersive surfactants which can be used in the present invention are the alkyl sulfates, especially those obtained by sulfating the higher alcohols ($C_8$–$C_{18}$ carbon atoms) produced from the glycerides of tallow or coconut oil; and alkyl benzene sulfonates, in which the alkyl group contains from about 9 to about 14 carbon atoms, in straight chain or branched chain configuration, e.g., those of the type described in U.S. Pat. Nos. 2,220,099 and 2,477,383, incorporated herein by reference. Linear straight chain alkyl benzene sulfonates in which the average of the alkyl groups is about 13 carbon atoms, abbreviated as $C_{13}$LAS, as well as mixed $C_{11.2}$ and $C_{11.8\ (avg.)}$ LAS are typically used. $C_{11}$–$C_{14}$ branched chain alkyl benzene sulfonates (ABS), which are excellent sudsers, can also be used.

Examples of commercially available alkyl benzene sulfonates (free acid form) useful in the instant invention include Conoca SA 515, SA 597, and SA 697, all marketed by the Continental Oil Company, and Calsoft LAS 99, marketed by the Pilot Chemical Company.

Other anionic surfactant compounds herein include the alkyl glyceryl ether sulfonates, especially those ethers of higher alcohols derived from tallow and coconut oil; coconut oil fatty acid monoglyceride sulfonates and sulfates; and alkyl phenol ethylene oxide ether sulfates containing about 1 to about 10 units of ethylene oxide per molecule and wherein the alkyl groups contain about 8 to about 12 carbon atoms.

Other useful anionic surfactants herein include the esters of $\alpha$-sulfonated fatty acids containing from about 6 to 20 carbon atoms in the ester group; 2-acyloxyalkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; olefin sulfonates containing from about 12 to 24 carbon atoms; and $\beta$-alkyloxy alkane sulfonates containing from about 1 to 3 carbon atoms in the alkyl group and from about 8 to 20 carbon atoms in the alkane moiety.

Anionic surfactants based on the higher fatty acids, i.e., "soaps" are useful anionic surfactants herein. Higher fatty acids containing from about 8 to about 24 carbon atoms and preferably from about 10 to about 20 carbon atoms are useful anionic surfactants in the present compositions. Particularly useful are the soaps derivable from the mixtures of fatty acids made from coconut oil and tallow.

Preferred water-soluble anionic organic surfactants herein include linear alkyl benzene sulfonates containing from about 10 to about 18 carbon atoms in the alkyl group; branched alkyl benzene sulfonates containing from about 10 to about 18 carbon atoms in the alkyl group; the tallow range alkyl sulfates; the coconut range alkyl glyceryl sulfonates; alkyl ether (ethoxylated) sulfates wherein the alkyl moiety contains from about 12 to 18 carbon atoms and wherein the average degree of ethoxylation varies between 1 and 12, especially 3 to 9; the sulfated condensation products of tallow alcohol with from about 3 to 12, especially 6 to 9, moles of ethylene oxide; olefin sulfonates containing from about 14 to 16 carbon atoms; and soaps, as hereinabove defined.

Specific preferred anionics for use herein include: the linear $C_{10}$–$C_{14}$ alkyl benzene sulfonates (LAS); the branched $C_{10}$ to $C_{14}$ alkyl benzene sulfonates (ABS); the tallow alkyl sulfates, the coconut alkyl glyceryl ether sulfonates; the sulfated condensation products of mixed $C_{10}$–$C_{18}$ tallow alcohols with from about 1 to about 14 moles of ethylene oxide; and the mixtures of higher fatty acids containing from 10 to 18 carbon atoms.

It is to be recognized that any of the foregoing anionic surfactants can be used separately herein or as mixtures. Moreover, commercial grades of the surfactants can contain non-interfering components which are processing by-products. For example, commercial $C_{10}$–$C_{14}$ alkaryl sulfonates can comprise alkyl benzene sulfonates, alkyl toluene sulfonates, alkyl naphthalene sulfonates and alkyl poly-benzenoid sulfonates. Such materials and mixtures thereof are fully contemplated for use herein.

The anionic detergents can be used in the form of their sodium; potassium; ammonium; mono-, di-, or triethanolammonium; calcium; or magnesium salts, or mixtures thereof. Mixtures of anionic detergents are desirable. Sodium and magnesium salts are preferred and magnesium salts are most preferred.

Adjunct Surfactants

The compositions herein can optionally employ various other adjunct surfactants which can be used to perform specific cleaning, suds modifying, etc., functions. Such optional surfactants include the various semi-polar, ampholytic, and zwitterionic surface active agents known in the art. Nonlimiting examples of such materials are as follows.

Semi-polar surfactants useful herein include water-soluble amine oxides containing one alkyl moiety of from about 10 to 28 carbon atoms and two moieties selected from the group consisting of alkyl moieties and hydroxyalkyl moieties containing from 1 to about 3 carbon atoms; water-soluble phosphine oxides containing one alkyl moiety of about 10 to 28 carbon atoms and two moieties selected from the group consisting of alkyl moieties and hydroxyalkyl moieties containing from about 1 to 3 carbon atoms; and water-soluble sulfoxides containing one alkyl moiety of from about 10 to 28 carbon atoms and a moiety selected from the group consisting of alkyl and hydroxyalkyl moieties of from 1 to 3 carbon atoms.

Ampholytic surfactants include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms, and at least one aliphatic substituent contains an anionic water-solubilizing group.

Zwitterionic surfactants include derivatives of aliphatic quaternary ammonium, phosphonium and sulfonium compounds in which the aliphatic moieties can be straight or branched chain, and wherein one of the aliphatic substituents contains from about 8 to 18 carbon atoms and one contains an anionic water solubilizing group. Preferred zwitterionic detergents are those disclosed in the copending U.S. patent application, U.S. Ser. No. 493,952, filed Aug. 1, 1974 by Laughlin and Stewart for detergent compositions containing said zwitterionic detergents, now U.S. Pat. No. 3,925,262.

The foregoing surfactant types are well known in the detergency arts.

Self-Emulsifiable Silicone Suds Controlling Agent

The self-emulsifiable silicone suds controlling agents are characterized by the presence of an emulsifying component (emulsifier). The preferred self-emulsifiable silicone suds controlling agents comprise, as an emulsifier, a polysiloxane characterized by the presence of polyoxyalkylene moieties incorporated into the basic polysiloxane structure to form an emulsifier. The polyoxyalkylene moieties are preferably pendant from the basic polysiloxane chain, but may be a part of the basic chain, normally as a block co-polymer. These self-emulsifiable silicone suds controlling agents can be incorporated in relatively large amounts without excessive separation.

The preferred emulsifiers for the self-emulsifiable suds controlling agents are typically represented by the formula $$R_aSiY_{4-a}$$

wherein *a* is 0 or an integer from 1 to 3; R is selected from the group consisting of (a) alkyl groups containing from one to about 30 carbon atoms, (b) groups having the formula $$-R'-(OR')_bOR''$$

wherein R' is an alkylene group containing from one to about six, preferably from two to four, carbon atoms, *b* has a value of from 1 to about 100; and R" is a capping group which can be selected from the group consisting of hydrogen, alkyl, aryl, alkaryl, aralkyl or alkenyl groups containing up to 20 carbon atoms; acyl groups containing up to 20 carbon atoms, sulfate, sulfonate, phosphate, phosphonate, borate, or isocyanate groups, or mixtures thereof; and Y is a group having the formula $$(-O-\underset{R}{\overset{R}{\underset{|}{\overset{|}{Si}}}}-)_c-OSiR_3$$

wherein R has the formula given hereinbefore, and *c* has a value from 1 to 200, preferably from about 10 to about 100; and wherein at least one R group in the compound has the aforesaid formula $$[-R'(OR')_b-R'']$$

Preferred emulsifiers for the self-emulsifiable silicone suds controlling agents are those described in Morehous, U.S. Pat. Nos. 3,233,986 and 3,511,788, said patents being incorporated herein by reference. The agents of U.S. Pat. No. 3,511,788 are most preferred.

Other effective self-emulsified silicone suds suppressors contain a high ethoxylate of a fatty acid as the emulsifying component. The condensation products of from about 300 to about 2,000 moles of ethylene oxide for each mole of fatty acid are particularly useful. Fatty acids are straightchain saturated and unsaturated monocarboxylic acids, usually containing an even number of carbon atoms (from about 10 to about 20), preferably around 18 in number. Examples of common fatty acids include palmitic acid, stearic acid and oleic acid.

The emulsifying component may also be a zwitterionic surface active agent. Zwitterionic surfactants useful herein include derivatives of aliphatic quaternary ammonium, phosphonium and sulfonium compounds, in which the aliphatic moieties can be straight or branched chain, and wherein one of the aliphatic substituents contains from about 8 to 18 carbon atoms and one contains an anionic water-solubilizing group. Preferred zwitterionic materials are the ethoxylated ammonium sulfonates and sulfates disclosed in U.S. Pat. No. 3,925,262, Laughlin et al, issued Dec. 2, 1975; U.S. Pat. No. 3,939,678, Laughlin et al, issued Dec. 30, 1975; and U.S. Patent application Ser. No. 603,837, Laughlin et al, filed Aug. 11, 1975, all of which are incorporated herein by reference.

Particularly preferred ethoxylated zwitterionic surfactants are those having the formula

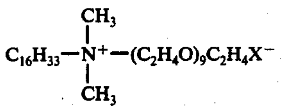

wherein X is $SO_3$ or $SO_4$.

Additional preferred zwitterionic surfactants include those having the formula

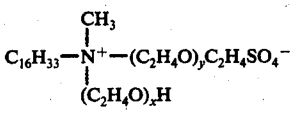

wherein the sum of $x + y$ is equal to about 15.

The Active Portion of the Silicone Suds Controlling Agents

The silicone materials employed as the active portion of the self-emulsifiable suds controlling agents herein can be alkylated polysiloxane materials of several types, either singly or in combination with various solid materials such as silica aerogels and xerogels and hydrophobic silicas of various types. In industrial practice, the term "silicone" has become a generic term which encompasses a variety of relatively high molecular weight polymers containing siloxane units and hydrocarbyl groups of various types. In general terms, the silicone suds controllers can be described as siloxanes having the general structure

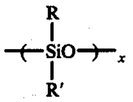

wherein $x$ is from about 20 to about 2,000, and R and R' are each alkyl or aryl groups, especially methyl, ethyl, propyl, butyl and phenyl. The polydimethylsiloxanes (R and R' are methyl) having a molecular weight within the range of from about 200 to about 200,000, and higher, are useful as suds controlling agents. Silicone materials are commercially available from the Dow Corning Corporation under the trade name Silicone 200 Fluids.

Additionally, other silicone materials wherein the side chain groups R and R' are alkyl, aryl, or mixed alkyl and aryl hydrocarbyl groups exhibit useful suds controlling properties. These materials are readily prepared by the hydrolysis of the appropriate alkyl, aryl or mixed alkylaryl silicone dichlorides with water in the manner well known in the art. As specific examples of such silicone suds controlling agents useful herein there can be mentioned, for example, diethyl polysiloxanes, dipropyl polysiloxanes; dibutyl polysiloxanes, methylethyl polysiloxanes, phenylmethyl polysiloxanes, and the like. The dimethyl polysiloxanes are particularly useful herein due to their low cost and ready availability.

A second type of silicone suds controlling agent useful in the compositions herein comprises a mixture of an alkylated siloxane of the type hereinabove disclosed and solid silica. Such mixtures of silicone and silica can be prepared by affixing the silicone to the surface of silica ($SiO_2$), for example by means of the catalytic reaction disclosed in U.S. Pat. No. 3,235,509. Suds controlling agents comprising mixtures of silicone and silica in a silicone:silica ratio of from 19:1 to 1:2, preferably 10:1 to 1:1. The silica can be chemically and/or physically bound to the silicone in an amount which is preferably about 10% to 15% by weight, based on the silicone. The particle size of the silica employed in such silica/silicone suds controlling agents should preferably be not more than 100 millimicrons, preferably from 10 millimicrons to 20 millimicrons, and the specific surface area of the silica should exceed about 50 $m^2/g$.

Alternatively, suds controlling agents comprising silicone and silica can be prepared by admixing a silicone fluid of the type hereinabove disclosed with a hydrophobic silica having a particle size and surface area in the range disclosed above. Any of several known methods may be used for making a hydrophobic silica which can be employed herein in combination with a silicone as the suds controlling agent. For example, a fumed silica can be reacted with a trialkyl chlorosilane (i.e., "silanated") to affix hydrophobic trialkylsilane groups on the surface of the silica. In a preferred and well known process, fumed silica is contacted with trimethylchlorosilane and a preferred hydrophobic silanated silica useful in the present compositions is secured.

In an alternate procedure, a hydrophobic silica useful in the present compositions and processes is obtained by contacting silica with any of the following compounds: metal, ammonium and substituted ammonium salts of long chain fatty acids, such as sodium stearate, aluminum stearate, and the like; silylhalides, such as ethyltrichlorosilane, butyltrichlorosilane, tricyclohexylchlorosilane, and the like; and long chain alkyl amines or ammonium salts, such as cetyl trimethyl amine, cetyl trimethyl ammonium chloride, and the like.

A preferred suds controlling agent herein comprises a hydrophobic silanated (most preferably trimethylsilanated) silica having a particle size in the range from about 10 millimicrons to 20 millimicrons and a specific surface area above about 50 $m^2/g$ intimately admixed with a dimethyl silicone fluid having a molecular weight in the range of from about 500 to about 200,000, at a weight ratio of silicone to silanated silica of from about 19:1 to about 1:2. Such suds controlling agents preferably comprise silicone and the silanated silica in a weight ratio of silicone:silanated silica of from 10:1 to 1:1. The mixed hydrophobic silanated (especially trimethylsilanated) silica-silicone suds controlling agents provide suds control over a broad range of temperatures, presumably due to the controlled release of the silicone from the surface of the silanated silica.

Another type of suds control agent herein comprises a silicone material of the type hereinabove diclosed sorbed onto and into a solid. Such suds controlling agents comprise the silicone and solid in a silicone:solid ratio of from about 20:1 to about 1:20, preferably about 5:1 to about 1:1. Examples of suitable solid sorbents for the silicones herein include clay, starch, kieselguhr, Fuller's Earth, and the like.

Yet another type of silicone suds controlling agent herein comprises a silicone fluid, a silicone resin and silica. The silicone fluids useful in such suds controlling mixtures are any of the types hereinabove disclosed, but are preferably dimethyl silicones. The silicone "resins" used in such compositions can be any alkylated silicone resins, but are usually those prepared from methylsilanes. Silicone resins are commonly described as "three-dimensional" polymers arising from the hydrolysis of alkyl trichlorosilanes, whereas the silicone fluids are "two-dimensional" polymers prepared from the hydrolysis of dichlorosilanes. The silica components of such compositions are the microporous materials such as the fumed silica aerogels and xerogels having the particle sizes and surface areas hereinabove disclosed.

The mixed silicone fluid/silicone resin/silica materials useful in the present compositions can be prepared in the manner disclosed in U.S. Pat. No. 3,455,839. These mixed materials are commercially available from the Dow Corning Corporation. According to U.S. Pat. No. 3,455,839, such materials can be described as mixtures consisting essentially of:

(a) from about 10 parts to about 100 parts by weight of a polydimethylsiloxane fluid having a viscosity in the range from 20 cs. to 1500 cs. at 25° C;

(b) 5 to 50 parts by weight of a siloxane resin composed of $(CH_3)_3SiO_{1/2}$ units and $SiO_2$ units in which the ratio of the $(CH_3)_3SiO_{1/2}$ units to the $SiO_2$ units is within the range of from 0.6/1 to 1.2/1; and (c) 1 to 10 parts by weight of a silica aerogel.

Such mixtures can also be sorbed onto and into a water-soluble solid as disclosed above.

Preferred self-emulsifiable silicone suds controlling agents containing mixtures of emulsifiers and suds controlling agents are disclosed in British Pat. No. 1,373,903 and U.S. Pat. No. 3,746,653, both of said patents being incorporated herein by reference. Preferably, the mixtures will contain at least 40% by weight of $R_aSiY_{4-a}$, from about 5% to about 45% by weight of a polydimethyl siloxane liquid, a minor amount of a polydimethyl siloxane resin, either alone or preferably in combination with from about 0.05% to about 5% by weight of silica, preferably in the form of an aerogel. Preferred materials are DB-544 and DB-31 manufactured by Dow Corning Corporation.

The self-emulsifiable agents will not separate from the rest of the compositions and it is believed they remain effective by staying intermixed with the nonionic surfactant.

The amount of silicone suds-suppressing agent is from about 0.01% to about 5%, preferably from about 0.05% to about 1%, and most preferably from about 0.1% to about 0.6% by weight of the composition.

The Alkanolamine

Another optional component of the detergent compositions of the present invention is an alkanolamine compound. The alkanolamine useful herein is selected from the group consisting of monoethanolamine, diethanolamine, triethanolamine, and mixtures thereof. Mixtures of these three alkanolamine compounds are produced by the reaction of ethylene oxide with ammonia. The pure compounds can be separated from such mixtures by standard distillation procedures.

The excess alkanolamine beyond that necessary to form any anionic surfactant salt contributes to detergency performance and serves as a buffering agent which maintains wash water pH of the present compositions within the preferred range from about 7 to about 9. A pH of about 7.8 is most preferred.

The Fatty Acid Corrosion Inhibitor

The present compositions also may contain from about 0.15% to about 2.0%, more preferably from about 0.3% to about 1.2%, by weight (based on the free acid form) of a $C_{10}$—$C_{22}$ fatty acid as a corrosion inhibitor.

Alkali Metal Bases

An alkali metal base may be added to the above-described detergent compositions to provide additional corrosion inhibition protection but at the risk of added inactivation of the silicone suds controlling agents. An alkali metal base such as sodium or potassium hydroxide, preferably potassium hydroxide, is added at a level of from about 0.1% to about 4% by weight of the total composition. Preferably from about 1.0% to about 2.5% by weight of the total composition of the alkali metal hydroxide is used.

The addition of the alkali metal base imparts a pH of from 7.5 to 10, preferably 8 to 9 to the compositions. When calcium or magnesium ions are present, the preferred pH is from about 6 to about 8. It has been disclosed that an alkaline pH gives added corrosion inhibition action to the compositions of this invention. A pH above 10 is avoided because of product instability. Another benefit derived from inclusion of the alkali metal base in the detergent composition is the degellant effect it provides.

Optional Components

Although the liquid detergent compositions of the instant invention need only contain the above-described components (i.e., thick, anhydrous compositions), highly preferred compositions herein can contain, in addition to the detersive ingredients and corrosion inhibitor, a solvent selected from the group consisting of water, anhydrous solvents, and water-alcohol mixtures. Such solvents can be employed to the extent of from about 1% to 45% by weight of the total detergent compositon. In preferred compositions the solvent is water, or a water-alcohol mixture and comprises from about 25% to 45%, most preferably about 33% to about 40%, by weight of the total composition. Use of such solvents in the compositions herein has several advantages. First, the physical stability of the detergent compositions can be improved by dilution with such solvents in that clear points can thereby be lowered. The diluted compositions do not cloud at the low temperatures which are commonly encountered during shipping or storing of commercially marketed detergent compositions.

Secondly, addition of solvents, especially water-alcohol mixtures, serves to regulate the gelling tendency which liquid detergent compositions of the instant type exhibit upon dilution with water.

When an alcohol-water mixture is employed as the carrier solvent herein, the weight ratio of water to alcohol preferably is maintained above about 5:1. High alcohol (particularly ethanol) concentrations in the water-alcohol mixtures used in the instant compositions are preferably avoided because of flammability problems which may arise at such higher alcohol levels. Moreover, those compositions which do not contain an alkali metal base contain a de-gellant such as potassium chloride, which may give rise to alkanolamine hydrochlorides after prolonged storage and chilling. To prevent the crystallization of such materials in the liquid compositions, it is most preferred to use carrier liquids comprising water and alcohol at a higher water:alcohol weight ratio, i.e., ratios of at least about 5:1, preferably about 5:1 to about 20:1.

Any alcohol containing from 1 to about 5 carbon atoms can be employed in the water-alcohol diluent used to prepare liquid detergent compositions. Examples of operable alcohols include methanol, ethanol, propanol, isopropanol, butanol, isobutanol, and pentanol; ethanol is highly preferred for use herein. Preferred compositions herein contain from about 25% to about 40%, most preferably 30% to 36%, by weight of water and 2.0% to 5.5%, most preferably 4.0% to 5.0% by weight of ethanol.

Another optional component which can be added to the detergent compositions of the instant invention is an electrolyte salt. As pointed out in U.S. Pat. Nos. 2,580,173 and 3,440,171, incorporated herein by reference, electrolyte salts lessen the gel formation which tends to occur with alkanolamine-neutralized surfactants. Normal sequestering or precipitating phosphate builders are not normally present in the compositions of this invention. Such electrolytes, when used herein in combination with a water-alcohol solvent at a weight percent of the total composition of from about 0.5% to 5% of said electrolyte salt, eliminate gelation of some anionic surfactants without the need for excessively high alcohol levels.

Operable electrolyte salts include the alkali metal chlorides, sulfates and carbonates, and the salts formed from the reaction of alkanolamines with inorganic acids, e.g. HCl, $H_2SO_4$, and organic acids such as formic, acetic, propionic, butyric and citric acid. Specific examples of such salts include sodium chloride, potassium chloride, sodium carbonate, potassium carbonate, potassium sulfate, sodium sulfate, triethanolamine sulfate, triethanolamine citrate, triethanolamine acetate, triethanolamine formate, monoethanolamine propionate and diethanolamine butyrate. Of all the possible electrolyte salts useful to prevent gelation of the compositions herein, potassium chloride is by far the most effective and preferred. Potassium chloride is preferably added to the instant compositions to the extent of from about 1% to about 3% by weight to provide its anti-gelling effects. Potassium chloride concentrations of about 1.5% to about 1.9% are preferred for use in combination with water-alcohol carrier liquids of the type disclosed above to avoid crystallization of chloride salts after prolonged aging and chilling of the liquid compositions herein.

As noted, the use of a solvent and electrolyte serves to control and regulate gel formation in the instant liquid detergent compositions. If, however, gel formation is desired, it is possible to select particular concentrations of a water solvent which yield gelled compositions in the absence of alcohol and electrolyte salt. Thus, compositions containing the detersive components and corrosive inhibitor in the above-specified concentrations and a water solvent comprising the balance, i.e., about 5% to 20% by weight, will be thick or gelled compositions, provided no alcohol or electrolyte is present.

Other optional, non-essential, non-interfering components are preferably added to the instant compositions to provide improved performance or aesthetic appeal. One such preferred type of composition is that containing a color stabilizing agent, especially citric acid. Such compositions exhibit surprising stability against the tendency to redden on prolonged storage. In addition, the presence of citric acid in some of the compositions of this invention can have a beneficial effect from the standpoint of preventing the development of unsightly colored stains observed on the outer surfaces of plastic bottles occasioned by spillage, seepage or handling of bottles with hands previously in contact with the instant compositions. As with the anionic surfactant acids, the citric acid color stabilizer forms alkanolamine citrate when added to compositions containing excess alkanolamine. In a preferred embodiment wherein the alkali metal base is added, an alkali metal citrate is formed as well. For convenience, however, this alkanolamine and/or alkali metal citrate concentration in the compositions is expressed as a weight percentage of the free acid form of the citrate, i.e., citric acid, added to the compositions. An amount of citric acid of up to about 1% by weight of composition is generally added to obtain these color benefits. To achieve these benefits, the amount of citric acid used is preferably in the range from about 0.05% to about 0.15% by of the composition. Of course, the compositions must still be formulated to maintain the minimum of about 1% (wt.) of free alkanolamine.

Other optional components include brighteners, fluorescers, enzymes, bleaching agents, anti-microbial agents, and coloring agents. Such components preferably comprise no more than about 3% by weight of the total composition.

The following examples illustrate the detergent compositions of the instant invention. The abbreviations for the nonionic surfactants employed, e.g., $C_{11-15}(EO)$ are standard for such materials and describe the average carbon content of the alcoholic lipophilic portion of the molecule and the ethylene oxide content of the hydrophilic portion of the molecule.

EXAMPLE I

A storage-stable, non-gelling, liquid detergent composition is as follows.

| Component | Wt. % |
|---|---|
| [1]$C_{14-15}(EO)_7$ | 33.0 |
| Linear alkylbenzene sulfonic acid wherein the alkyl chain averages 11.4 carbon atoms in length (free acid form) | 16.5 |
| Triethanolamine (total) | 11.0 |
| KCl | 2.0 |
| Ethanol | 4.2 |
| Potassium hydroxide | 1.8 |
| Citric acid (free acid form) | 1.0 |
| Brightener, perfume, dye | 1.1 |
| [2]DB-544 | 0.5 |
| Water | Balance |

[1]Commercially available as Neodol 45-7
[2]Commercial self-emulsifiable mixture of alkoxyated siloxane, siloxane liquid, siloxane resin and aerogel silica. Sold by Dow Corning Corporation

EXAMPLE II

A storage-stable, non-gelling, liquid detergent composition is as follows .

| Component | Wt. % |
|---|---|
| [1]$C_nA(EO)_6$ | 33.0 |
| Linear alkylbenzene sulfonic acid wherein the alkyl chain averages 11.4 carbon atoms in length (free acid form) | 16.5 |
| Triethanolamine (total) | 11.0 |
| KCl | 2.0 |
| Ethanol | 4.2 |
| Potassium hydroxide | 1.8 |
| Citric acid (free acid form) | 1.0 |
| Brightener, perfume, dye | 1.1 |
| [2]DB-544 | 0.5 |

-continued

| Component | Wt. % |
|---|---|
| Water | Balance |

[1]Ethoxylated alcohols derived from coconut fatty acids
[2]Commercial mixture of alkoxylated siloxane, siloxane liquid, siloxane resin and aerogel silica. Sold by Dow Corning Corporation.

EXAMPLE III

A storage-stable, non-gelling, liquid detergent composition is as follows.

| Component | Wt. % |
|---|---|
| [1]$C_nA(EO)_6$ | 33.0 |
| Linear alkylbenzene sulfonic acid wherein the alkyl chain averages 11.4 carbon atoms in length (free acid form) | 16.5 |
| Monoethanolamine | 4.7 |
| KCl | 2.0 |
| Ethanol | 4.2 |
| Potassium hydroxide | 1.8 |
| Citric acid (free acid form) | 1.0 |
| Brightener, perfume, dye | 1.1 |
| [2]DB-544 | 0.5 |
| Water | Balance |

[1]Ethoxylated alcohols derived from coconut fatty acids
[2]Commercial mixture of alkoxylated siloxane, siloxane liquid, siloxane resin and aerogel silica. Sold by Dow Corning Corporation.

EXAMPLE IV

A storage-stable, non-gelling, liquid detergent composition is as follows.

| Component | Wt. % |
|---|---|
| [1]$C_{14-15}(EO)_7$ | 33.0 |
| Linear alkylbenzene sulfonic acid wherein the alkyl chain averages 11.4 carbon atoms in length (free acid form) | 16.5 |
| Triethanolamine (total) | 11.0 |
| KCl | 2.0 |
| Ethanol | 4.2 |
| Potassium hydroxide | 1.8 |
| Citric acid (free acid form) | 1.0 |
| Brightener, perfume, dye | 1.1 |
| [2]DB-31 | 0.5 |
| Water | Balance |

[1]Commercially available as Neodol 45-7
[2]Commercial mixture of ethoxylated fatty acid emulsifier (300–2,000 EO per moledule), and silicone/silica suds suppressor. Sold by Dow Corning Corporation.

EXAMPLE V

A storage-stable, non-gelling, liquid detergent composition is as follows.

| Component | Wt. % |
|---|---|
| [1]$C_nA(EO)_6$ | 33.0 |
| A 1:1 mixture by weight of coconut alkyl sulfuric acid and coconut alkyl polyethoxylated (6) sulfuric acid | 16.5 |
| Monoethanolamine | 4.7 |
| KCl | 2.0 |
| Ethanol | 4.2 |
| DB-544 | 0.8 |
| Potassium hydroxide | 1.8 |
| Citric acid (free acid form) | 1.0 |
| Brightener, perfume, dye | 1.1 |
| Water | Balance |

[1]Ethoxylated alcohols derived from coconut fatty acids

EXAMPLE VI

A storage-stable, non-gelling, liquid detergent composition is as follows.

| Component | Wt. % |
|---|---|
| [1]$C_{14-15}(EO)_7$ | 33.0 |
| Paraffin sulfonic acid containing a $C_{14}$–$C_{15}$ straight chain alkyl group | 16.5 |
| Triethanolamine (total) | 11.0 |
| KCl | 2.0 |
| Ethanol | 4.2 |
| Potassium hydroxide | 1.8 |
| Citric acid (free acid form) | 1.0 |
| Brightener, perfume, dye | 1.1 |
| [2]DB-544 | 0.5 |
| Water | Balance |

[1]Commercially available as Neodol 45-7
[2]Self-emulsifiable liquid polydimethylsiloxane/siloxane resin/silica aerogel sold by Dow Corning Corporation.

EXAMPLE VII

A storage-stable, non-gelling, liquid detergent composition is as follows.

| Component | Wt. % |
|---|---|
| [1]$C_{14-15}(EO)_7$ | 33.0 |
| Linear alkylbenzene sulfonic acid wherein the alkyl chain averages 11.4 carbon atoms in length (acid free form) | 16.5 |
| Triethanolamine (total) | 11.0 |
| KCl | 2.0 |
| Ethanol | 4.2 |
| Potassium hydroxide | 1.8 |
| Citric acid (free acid form) | 1.0 |
| Brightener, perfume, dye | 1.1 |
| [2]DB-544 | 0.1 |
| Water | Balance |

[1]Commercially available as Neodol 45-7[2]Commercial mixture of alkoxylated siloxane, siloxane liquid, siloxane resin and aerogel silica. Sold by Dow Corning Corporation.

EXAMPLES VIII AND IX

Heavy duty, substantially homogeneous liquid detergent compositions were prepared by conventional mixing of the ingredients listed hereinafter:

| Ingredient | Parts by Weight | |
|---|---|---|
| | VIII | IX |
| Linear dodecylbenzene sulfonate-triethanolamine neutralized | 20 | 20 |
| Condensate of natural tallow alcohol and 11 moles of ethylene oxide | 20 | 20 |
| Condensate of $C_{14}$–$C_{15}$ 1:1 synthetic alcohol with 4 moles of ethylene oxide | 10 | 10 |
| Triethanolamine | 1 | 1 |
| Ethanol | 15 | 15 |
| Suds regulating agent | | |
| [1]Dow Corning DB-544 | 0.1 | — |
| [2]Dow Corning DB-31 | — | 0.1 |
| Minors and water | to 100 | to 100 |

[1]Commercial mixture of alkoxylated siloxane, siloxane liquid, siloxane resin and aerogel silica. Sold by Dow Corning Corporation.
[2]A product of Dow Corning Corporation.

Additional liquid detergent compositions were prepared wherein (b) the suds regulator is left out; and (c) the suds regulating agent is replaced with an equivalent quantity, i.e., 0.5% of a saturated $C_{16}$–$C_{22}$ fatty acid.

The suds regulating activity was measured in a mini-drum washer under the following conditions:

| | |
|---|---|
| Product concentration: | 0.3% (weight/volume) |
| Cycle (no load and no soil added): | heat-up to 90° C in 20′ followed by 10′ at 90° C. |

The suds height was measured in cm at 90° C at the end of the 10′ period. The testing results were as follows:

| | No Suds Suppressor | $C_{16}$–$C_{22}$ Saturated Fatty Acid | DB-544 | DB-31 |
|---|---|---|---|---|
| Freshly made | 25 (oversuds) | 15 – 20 | 2 | 2 |
| Storage: 1 week at 50° C | — | — | 2 | 2 |

The above results highlight the amazingly superior suds regulating activity provided by the compositions of this invention by reference to a well-known prior art suds regulator.

| | X | XI | XII |
|---|---|---|---|
| Triethanolamine salt of $C_{11.8}$ linear alkyl benzene sulfonate | 16.5 | 16.5 | 16.5 |
| Triethanolamine | 5.5 | 5.5 | 5.5 |
| 95% $C_{10}$/5% $C_8$ fatty alcohol ethoxylated to an initial level of 3 EO groups per molecule of alcohol stripped to give an average of 4.1 EO groups per molecule of alcohol | 33.0 | — | — |
| $C_{12-13}$ linear primary alcohol ethoxylate having an average of 3 EO groups per molecule of alcohol | — | 33.0 | — |
| $C_{14-15}$ primary alcohol ethoxylate derived from OXO alcohols and having 3 EO groups per molecule of alcohol | — | — | 33.0 |
| DB-544 - commercial mixture of alkoxylated siloxane, siloxane liquid, siloxane resin and aerogel silica. Sold by Dow Corning Corporation. | 0.3 | 0.25 | 0.2 |
| Water | Balance to 100 % | | |

In Examples I - XII the sudsing characteristics of the formulas are markedly reduced even after storage and the suds controlling agents are essentially stable in the formulas.

What is claimed is:

1. A concentrated, essentially homogeneous, low-sudsing liquid detergent composition comprising:

(a) from about 10% to about 50% by weight of a non-ionic surfactant;

(b) from about 10% to about 50% by weight of an anionic surfactant, the total amount of surfactant being more than about 30% and the ratio of non-ionic surfactant to anionic surfactant being within the range of from about 1:8 to about 8:1 based on the free acid form of the anionic surfactant; and (c) an effective amount of self-emulsifiable silicone suds controlling agent comprising a silicone suds controlling agent and an emulsifier for said silicone suds controlling agent.

2. The composition of claim 1 containing from about 1% to about 45% by weight of the composition of a solvent selected from the group consisting of water and water/alcohol mixtures.

3. The composition of claim 2 wherein the alcohol is ethanol.

4. The composition of claim 1 wherein the nonionic detergent is the condensation product of an alcohol containing from about 8 to about 22 carbon atoms and from 2 to 20 moles of ethylene oxide per mole of alcohol.

5. The composition of claim 4 wherein the alcohol contains from about 8 to about 18 carbon atoms, there are from 2 to 12 moles of ethylene oxide, and the HLB of the nonionic detergent is from about 8 to about 15.

6. The composition of claim 1 wherein the anionic detergent is selected from the group consisting of alkyl sulfates, alkyl benzene sulfonates, alkyl sulfonates, alkyl polyethoxylate sulfates containing 1 to 10 moles of ethyleneoxide per molecule, and mixtures thereof, said alkyl and alkyl benzene groups containing from 6 to about 22 carbon atoms and the cations of said anionic detergent being selected from the group consisting of sodium, potassium, ammonium, monoethanolammonium, diethanolammonium, triethanolammonium, calcium and magnesium cations.

7. The composition of claim 6 wherein the nonionic detergent is the condensation product of an alcohol containing from about 8 to about 22 carbon atoms and from 2 to about 20 moles of ethylene oxide per mole of alcohol.

8. The composition of claim 1 wherein the self-emulsifiable silicone suds controlling agent is present in an amount of from about 0.01% to about 5% by weight and comprises an emulsifier which is a siloxane containing a polyoxyalkylated moiety.

9. The composition of claim 8 wherein the self-emulsifiable silicone suds controlling agent is present in an amount from about 0.05% to about 1% and the emulsifier has the formula:

$$R_aSiY_{4-a}$$

wherein $a$ is 0 or an integer from 1 to 3; R is selected from the group consisting of (a) alkyl groups containing from one to about 30 carbon atoms, (b) groups having the formula —R′—(OR′)$_b$OR″ wherein R′ is an alkylene group containing from one to about six, preferably from two to four, carbon atoms, $b$ has a value of from 1 to about 100; and R″ is a capping group which can be selected from the group consisting of hydrogen, alkyl, aryl, alkaryl, aralkyl or alkenyl groups containing up to 20 carbon atoms; acyl groups containing up to 20 carbon atoms, sulfate, sulfonate, phosphate, phosphonate, borate, or isocyanate groups, or mixtures thereof; and Y is a group having the formula $$(-O-\underset{R}{\overset{R}{\underset{|}{\overset{|}{Si}}}}-)_c-OSiR_3$$

wherein R has the formula given hereinbefore, and $c$ has a value from 1 to 200, preferably from about 10 to about 100; and wherein at least one R group in the compound has the aforesaid formula $$[-R'(OR')_b-R'']$$

10. The composition of claim 9 in which the selfemulsifiable silicone suds controlling agent comprises a material of the formula

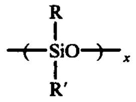

wherein $x$ is from about 20 to about 2,000 and R and R' are each selected from the group consisting of methyl, ethyl, propyl, butyl, and phenyl.

11. The composition of claim 9 in which the selfemulsifiable silicone suds controlling agent comprises a polydimethylsiloxane having a molecular weight of from about 200 to about 200,000.

12. The composition of claim 9 in which the selfemulsifiable silicone suds controlling agent comprises an alkylated silicone/silica mixture in which the ratio of silicone to silica is from about 19:1 to 1:2, the particle size of the silica is not more than 100 millimicrons, the specific surface area of the silica exceeds $50m^2/g.$, and up to 15% by weight of the silicone can be bound to said silica.

13. The composition of claim 12 in which the silicone is a polydimethylsilicone.

14. The composition of claim 9 in which the selfemulsifiable silicone suds controlling agent comprises a mixture consisting essentially of:

(a) from about 10 parts to about 100 parts by weight of a polydimethylsiloxane fluid having a viscosity in the range from 20 cs. to 1500 cs. at 25° C;

(b) 5 to 50 parts by weight of a siloxane resin composed of $(CH_3)_3SiO_{1/2}$ units and $SiO_2$ units in which the ratio of the $(CH_3)_3SiO_{1/2}$ units to the $SiO_2$ units is within the range of from 0.6/1 to 1.2/1; and (c) 1 to 10 parts by weight of a silica aerogel.

15. The composition of claim 9 wherein the said self-emulsifiable silicone suds controlling agent comprises at least 40% of a mixture of silicone suds controlling agents comprising, by weight of the agent, from 5% to 45% polydimethylsiloxane, from 0.05% to 5% silica, and a minor amount of a polydimethylsiloxane resin.

16. The composition of claim 9 comprising from about 0.1% to about 0.6% of the self-emulsifiable silicone suds controlling agent.

17. The composition of claim 1 wherein the emulsifier for the suds controlling agent is a polyethoxylated fatty acid in which said acid contains from 8 to 22 carbon atoms and in which there are from about 300 to about 2,000 ethoxy groups per molecule.

18. The composition of claim 17 in which the selfemulsifiable silicone suds controlling agent comprises a material of the formula

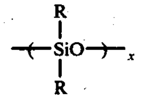

wherein $x$ is from about 20 to about 2,000 and R and R' are each selected from the group consisting of methyl, ethyl, propyl, butyl, and phenyl.

19. The composition of claim 17 in which the selfemulsifiable silicone suds controlling agent comprises an alkylated silicone/silica mixture in which the ratio of silicone to silica is from about 19:1 to 1:2, the particle size of the silica is not more than 100 millimicrons, the specific surface area of the silica exceeds $50m^2/g.$, and up to 15% by weight of the silicone can be bound to said silica.

20. The composition of claim 17 in which the selfemulsifiable silicone suds controlling agent comprises a mixture consisting essentially of:

(a) from about 10 parts to about 100 parts by weight of a polydimethylsiloxane fluid having a viscosity in the range from 20 cs. to 1500 cs. at 25° C;

(b) 5 to 50 parts by weight of a siloxane resin composed of $(CH_3)_3SiO_{1/2}$ units and $SiO_2$ units in which the ratio of the $(CH_3)_3SiO_{1/2}$ units to the $SiO_2$ units is within the range of from 0.6/1 to 1.2/1; and (c) 1 to 10 parts by weight of a silica aerogel.

* * * * *

UNITED STATES PATENT AND TRADEMARK OFFICE
CERTIFICATE OF CORRECTION

PATENT NO. : 4,075,118

DATED : February 21, 1978

INVENTOR(S) : Terrell Wilson Gault, Edward John Maguire, Jr.

It is certified that error appears in the above-identified patent and that said Letters Patent are hereby corrected as shown below:

Column 1, line 11 "1974" should be -- 1975 --.

Column 17, line 62 after "suds controlling agent" please add -- comprising a silicone suds controlling agent and an emulsifier for said silicone suds controlling agent --.

Signed and Sealed this

*Twenty-seventh* Day of *March 1979*

[SEAL]

*Attest:*

RUTH C. MASON
*Attesting Officer*

DONALD W. BANNER
*Commissioner of Patents and Trademarks*